United States Patent
Wilhelmsson (10) Patent No.: US 7,599,453 B2
(45) Date of Patent: Oct. 6, 2009

(54) DOPPLER SPREAD ESTIMATION FOR OFDM SYSTEMS

(75) Inventor: Leif Wilhelmsson, Dalby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 575 days.

(21) Appl. No.: 11/110,668

(22) Filed: Apr. 21, 2005

(65) Prior Publication Data
US 2006/0239364 A1  Oct. 26, 2006

(51) Int. Cl.
*H04L 27/06* (2006.01)
(52) U.S. Cl. .............. 375/344; 342/299; 370/235; 370/329; 375/150; 375/224; 375/232; 375/316; 375/340; 375/347; 455/101; 455/132; 455/272; 455/296
(58) Field of Classification Search ............... 375/260
See application file for complete search history.

(56) References Cited

U.S. PATENT DOCUMENTS

| | | | |
|---|---|---|---|
| 4,349,915 A | 9/1982 | Costas | |
| 5,572,548 A | 11/1996 | Pirez et al. | |
| 5,852,630 A * | 12/1998 | Langberg et al. | 375/219 |
| 6,035,003 A * | 3/2000 | Park et al. | 375/326 |
| 6,067,315 A | 5/2000 | Sandin | |
| 6,130,859 A | 10/2000 | Sonnenschein et al. | |
| 6,362,781 B1 | 3/2002 | Thomas et al. | |
| 6,445,342 B1 | 9/2002 | Thomas et al. | |
| 6,640,088 B2 | 10/2003 | Thomas et al. | |
| 6,680,969 B1 * | 1/2004 | Molnar et al. | 375/224 |
| 6,826,240 B1 * | 11/2004 | Thomas et al. | 375/340 |
| 6,922,452 B2 * | 7/2005 | Sandberg | 375/346 |
| 7,388,922 B2 * | 6/2008 | Yamagata | 375/260 |
| 2002/0181626 A1 | 12/2002 | Sung | |
| 2003/0128660 A1 * | 7/2003 | Ito et al. | 370/210 |
| 2004/0013169 A1 | 1/2004 | Kanemoto et al. | |
| 2004/0114506 A1 | 6/2004 | Chang et al. | |
| 2006/0115011 A1 | 6/2006 | Tsuruta et al. | |

FOREIGN PATENT DOCUMENTS

| | | |
|---|---|---|
| EP | 1450497 A2 | 8/2004 |
| EP | 1 580 948 A | 9/2005 |

(Continued)

OTHER PUBLICATIONS

PCT International Search Report, dated Jul. 18, 2006, in connection with International Application No. PCT/EP2006/003175.

(Continued)

*Primary Examiner*—Shuwang Liu
*Assistant Examiner*—Dhaval Patel
(74) *Attorney, Agent, or Firm*—Potomac Patent Group PLLC (57) ABSTRACT

A Doppler spread value of a channel in an Orthogonal Frequency Division Multiplexing (OFDM) system is estimated, wherein the channel comprises a plurality of carrier frequencies. Estimating involves selecting a set of two or more carrier frequencies from the plurality of carrier frequencies. A Doppler spread value is estimated for each of the selected carrier frequencies. An estimate of the Doppler spread value of the channel is produced by combining the estimated Doppler spread values of each of the selected carrier frequencies. For example, the Doppler spread value of the channel may be estimated by averaging the estimated Doppler spread values of each of the selected carrier frequencies.

29 Claims, 7 Drawing Sheets

FOREIGN PATENT DOCUMENTS

| JP | 2002 152088 | 5/2002 |
|---|---|---|
| WO | WO 03/058907 A | 7/2003 |

OTHER PUBLICATIONS

PCT Written Opinion, dated Jul. 18, 2006, in connection with International Application No. PCT/EP2006/003175.

Yucek, T. et al., "Doppler spread estimation for wireless OFDM systems" Advances in Wired and Wireless Communication, 2005 IEEE/Sarnoff Symposium on Princeton, New Jersey, USA Apr. 18-19, 2005, Piscataway, NJ, USA, IEEE Apr. 18, 2005, pp. 233-236, XP010793787.

Schober, H. et al., "Velocity estimation for OFDM based Communication Systems" VTC 2002-Fall. 2002 IEEE 56$^{th}$ Vehicular Technology Conference Proceedings. Vancouver, Canada, Sep. 24-28, 2002, IEEE Vehicular Technology Conference, New York, NY, IEEE, US, vol. 1 of 4. Conf. 56, Sep. 24, 2002, pp. 715-718, XP010608905.

ETSI EN 300 744 V.1.4.1 (Jan. 2001), "Digital Video Broadcasting (DVB); Framing structure, channel coding and modulation for digital terrestrial television".

Tepedelenlioglu, C. et al., "Estimation of Doppler spread and signal strength in mobile communications with applications to handoff and adaptive transmission", *Wirel. Commun. And Mob. Comput.*, pp. 221-242, vol. 1, 2001.

Nakamura, M. et al., "ICI cancellation technique based on estimating delay and Doppler profile in OFDM reception", Journal of the Institute of Image Information and Television Engineers, vol. 56, No. 12, pp. 1951-1958, Dec. 2002, Inst. Image Info. & Telev. Eng, Japan (Abstract).

Shuwei, S. et al., "A Simple Channel Estimator for OFDM with transmit diversity in rapid fading channels", 14$^{th}$ IEEE 2003 International Symposium on Personal, Indoor and Mobile Radio Communications. Proceedings, Part vol. 3, pp. 2254-2256 vol. 3, 2003, IEEE, USA (Abstract).

Nakamura, M. et al., "A Study on an MMSE ICI canceller for OFDM under Doppler-spread channel", 14$^{th}$ IEEE 2003 International Symposium on Personal, Indoor and Mobile Radio Communications. Proceedings, Part vol. 1, pp. 236-240 vol. 1, 2003, IEEE, USA.

Nakamura, M. et al., "MMSE ICI canceller for OFDM mobile reception", Journal of the Institute of Image Information and Television Engineers, vol. 58, No. 1, pp. 83-90, Jan. 2004, Inst. Image Info. & Telev. Eng. Japan (Abstract).

Kadous, T.A. et al., "An integrated framework for MC-CDMA reception in the presence of frequency offsets, phase noise, and fast fading", IEEE Transactions on Wireless Communications, vol. 3, No. 4, pp. 1224-1235, Jul. 2004, IEEE, USA (Abstract).

Nakamura, M. et al., "New Estimation and Equalization Approach for OFDM under Doppler-spread channel", PIMRC 2002, Sep. 15-18, 2002, IEEE, USA.

* cited by examiner

DOPPLER SPREAD ESTIMATION FOR OFDM SYSTEMS

BACKGROUND

The present invention relates to digital communication where Orthogonal Frequency Division Multiplexing (OFDM) is employed, and more particularly to estimation of the Doppler spread of an OFDM channel.

In wireless communications, the channel is typically time-varying. This can be due to movement of the transmitter, movement of the receiver, and/or changes in the communications environment. For cellular systems (such as the Global System for Mobile communication (GSM) and the Wideband Code Division Multiple Access system (WCDMA)) and for broadcast systems (such as Digital Audio Broadcasting (DAB) and Digital Video Broadcasting (DVB)), the major cause for large Doppler spread is relatively high speed movement of the communications terminal. The standards for DAB and DVB call for the use of OFDM in communicating information from the transmitter to a receiver.

In an OFDM system, a channel comprises a number of sub-carriers (henceforth referred to simply as "carriers") that are independently modulated, each by its own data. The modulation can be in accordance with a number of well-known techniques, such as Quadrature Amplitude Modulation (QAM) or n-ary Phase Shift Keying (n-PSK). The baseband signal in an OFDM system is then the sum of these modulated sub-carriers. The baseband signal is then used to modulate a main radio frequency (RF) signal. An important aspect of demodulating such a signal (thereby retrieving the underlying baseband signal) involves processing it by a Fast Fourier Transform (FFT). An advantage of communicating by means of OFDM is that it allows for communication over highly time-dispersive channels using reasonable complexity at the receiver side.

Whether a channel should be considered highly time-dispersive or not depends on the symbol rate that is used by the system. As a rule-of-thumb, a channel might be considered as non-dispersive if the root mean square (rms) delay spread of the channel is less than 10% of the symbol duration. Thus advantages of OFDM become more pronounced as the supported data rate is increased, which is exactly the case for most of the emerging systems.

Figure 1:
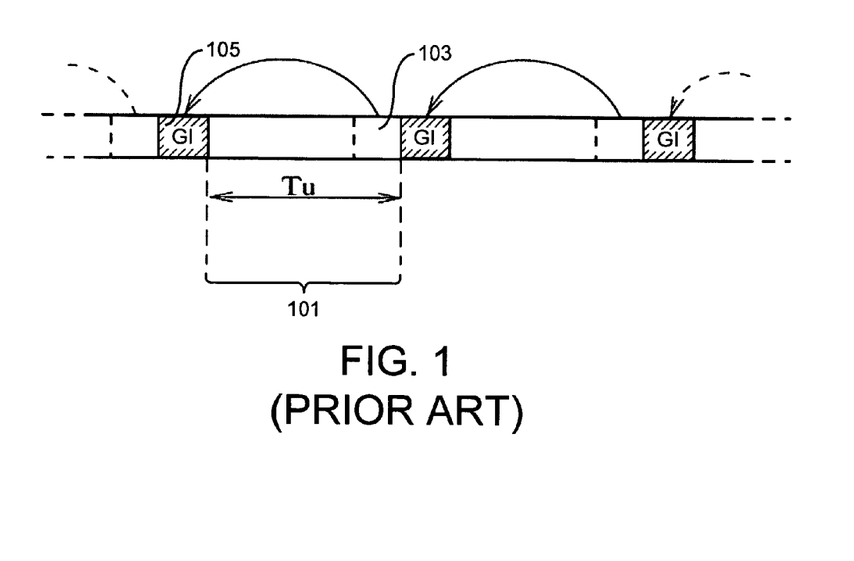
FIG. 1 is a schematic illustration of symbols separated by guard intervals in an orthogonal frequency division multiplexing (OFDM) system.

The way to handle large delay spreads for a system based on OFDM is to make use of a guard interval (GI). The GI (also referred to in the literature as a "cyclic prefix", or "CP") is simply a copy of the last part of an OFDM symbol that is sent before the actual symbol. This is schematically illustrated in FIG. 1, which shows a number of symbols. An exemplary one of the symbols 101 includes a last portion 103 that is transmitted as part of a preceding guard interval 105 (time flows from left to right in the figure). Other guard intervals are similarly formed from end portions of their immediately succeeding symbols.

It is well-known that for a system based on OFDM the effect of the time-dispersive channel, known as inter-symbol interference (ISI), can be avoided provided that the length of the GI, $T_G$, is at least as long as the (maximum) duration of the impulse response of the channel, henceforth denoted $T_m$. Because of the ability of an OFDM system to handle large delay spreads, it is very suitable for so-called Single Frequency Networks (SFN), which might be used for broadcasting. (In a single frequency network, geographically spaced transmitters operate on a same frequency. To reduce interference, they are time synchronized with one another.)

Suppose that the information carrying part of the OFDM begins at t=0, and that the length of the guard interval is $T_G$. If the channel has a maximum delay spread, $T_m$, the requirement on the start of the FFT window is given by $$-T_G + T_m < t \leq 0. \qquad (1)$$

Thus, as long as $T_m < T_G$ it is possible to avoid ISI if t is chosen according to equation (1). However, if $T_m > T_G$ the issue is to choose t such that the effect of ISI is minimized. For systems designed for use in a SFN, the guard interval is typically so large that the first situation is the likelier one.

Now, as discussed above, ISI free reception is possible whenever $T_m < T_G$. However, this requires identifying the exact start of the information carrying part of the signal. For this reason, OFDM receivers include arrangements for estimating the timing and frequency of the received signal.

To further improve performance, OFDM receivers typically include channel estimators, whose job is to dynamically determine the channel response. This information is then used to enable the receiver to process the received signal in a way that compensates for the time dispersion effects of the channel.

A conventional way of determining the channel response in an OFDM receiver is to dedicate certain ones of the carriers for use in conveying pilot signals. The pilot signals contain known information that permits the channel estimator to determine the channel response on that carrier frequency by comparing the actually received signal with the signal known to have been transmitted (i.e., one that the receiver would have expected to receive under ideal channel conditions). The carriers conveying the pilot signals are spaced apart in frequency by an amount that permits the channel response of carriers lying in-between the pilot carriers to be accurately estimated by interpolating the channel responses determined for the pilot carriers.

Figure 2:
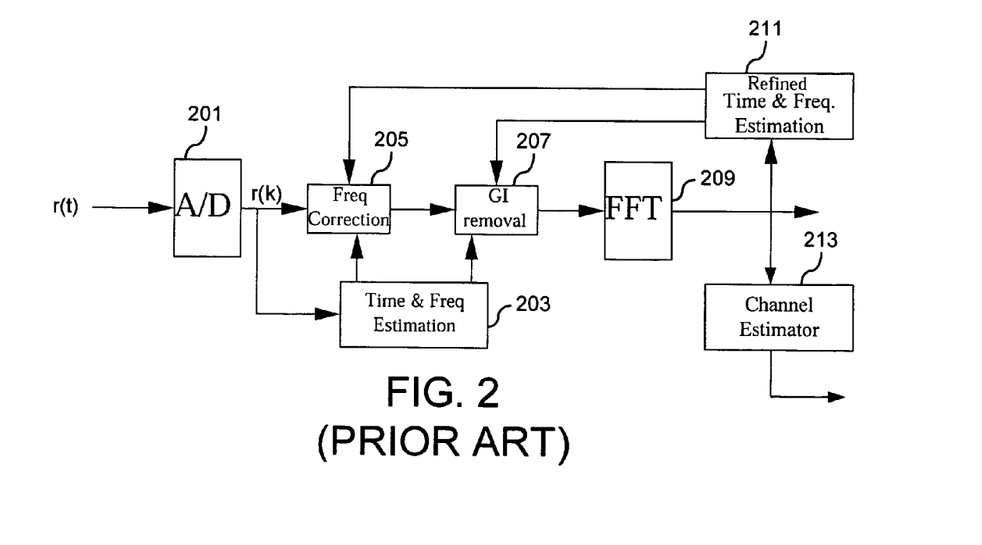
FIG. 2 is a block diagram of an exemplary OFDM receiver.

FIG. 2 is a block diagram of an exemplary OFDM receiver. An analog signal, r(t), generated by receiving and downconverting (either to intermediate frequency or baseband) a radiofrequency signal, is supplied to an analog-to-digital (A/D) converter 201. The digitized signal, r(k), is then supplied to a coarse timing and frequency estimation unit 203, which generates a coarse estimate of the timing and frequency offset of the received signal. (The frequency offset is the difference between the frequency of the transmitted signal and the frequency of the received signal.) This information is supplied to a frequency correction unit 205 as well as a GI removal unit 207. The GI removal unit 207 also receives the output of the frequency correction unit 205. Based on the best timing and frequency information available, the GI removal unit 207 removes the GI and supplies the information part of the received signal to an FFT unit 209, whose output is supplied to the remainder of the receiver, including a refined timing and frequency estimation unit 211, which is able to generate more accurate timing and frequency information from the FFT output signal. The more accurate frequency information is fed back to the frequency correction unit 205 to improve its performance. The more accurate timing information is similarly fed back to the GI removal unit 207 to improve its performance.

The output of the FFT unit 209 is also supplied to a channel estimator 213, which generates a complete estimate of the channel response by interpolation, as explained above.

How quickly the channel is changing is often measured by the so-called Doppler spread or the maximum Doppler frequency, $f_D$. The Doppler frequency is defined as $$f_D = v\frac{f_c}{c} \quad (2)$$

where v is the speed of the receiver in m/s, $f_c$ is the carrier frequency in Hz, and c is the speed of light in a vacuum (i.e., approximately $3 \cdot 10^8$ m/s).

It is important at this point, in order to ensure clarity of discussion, to define a number of issues, each associated with the word "Doppler", that arise in communications contexts. These are:

1. A pure Doppler shift. This is what one encounters when dealing with a one-tap channel, and the result is a pure frequency error. The Doppler shift frequency error cannot be distinguished from a frequency error that is caused by a transmitter and receiver not using exactly the same frequency. A pure Doppler shift is relatively easy to estimate, and completely trivial to remove. This is done by effectively multiplying the received signal by a complex signal with minus the estimated Doppler shift.

2. Doppler spread. Where a communications channel is characterized by multi-path propagation, different paths will arrive at different angles and by that have different Doppler shifts. The maximum Doppler shift is obtained when the angle of arrival is 0 and pi (but with a different sign for the two angles), and all Doppler frequencies in-between are possible. In contrast to the case of a pure Doppler shift, Doppler spread cannot be easily compensated by multiplying with a complex signal. In communication systems, Doppler spread is often treated as a frequency error that simply cannot be removed, and this is considered for instance when channel estimation is to be performed. The effect of Doppler spread is also very much like a non-compensated frequency error.

3. Inter-Carrier Interference (ICI) due to Doppler spread. In OFDM systems, a pure Doppler shift is usually no problem for the same reason that it is not a problem in single carrier systems—it can easily be removed. If not removed, then it is a problem for the same reason as for single carrier systems and in addition because it causes FFT leakage. In a similar fashion as for single carrier systems, the effect of Doppler spread cannot be easily counteracted by a complex multiplication. Instead, ICI cancellation is a rather complex operation that is done after the FFT in an OFDM receiver (removing a pure Doppler would have been done prior to the FFT) and requires the channel to be accurately estimated.

The focus of the discussion and description of embodiments that follows is that described in paragraph "2" above, namely, the determination of Doppler spread in an OFDM communications system. It is assumed that the frequency offset has been removed prior to the FFT.

As discussed above, a high degree of Doppler spread implies that the channel is changing quickly. This, in turn, means that reception of a signal becomes more difficult if specific knowledge of the channel (like phase and amplitude) is required for properly demodulating the signal. Since it is often possible to determine what the highest Doppler frequency is that will be experienced under typical operating conditions, it is possible to design a receiver based on this Doppler frequency. However, in case the actually experienced Doppler frequency is significantly smaller, designing for the worst case means that unnecessarily complex algorithms are used for channel estimation.

Knowledge of the Doppler frequency can also be used to determine how frequently some algorithms in a receiver have to be activated. For example, knowledge of the Doppler frequency can be used to determine, among other things, for a path searcher in a CDMA receiver, how often it is necessary to search for new paths in the impulse response;

how often algorithms related to handover between cells in a cellular communications system should be initiated (the higher the Doppler frequency, the more often such algorithms should be run, since a high Doppler frequency indicates faster movement of the receiver); and in a single frequency network, how often to scan for a better frequency that communications can be handed off to.

Thus, although it is possible to design a receiver for the worst case Doppler spread, it is usually a very wasteful approach.

In addition, in instances in which the channel estimation is based on Wiener filters to further improve the performance, as described in U.S. patent application Ser. No. 10/920,928 entitled "Channel estimation by adaptive estimation in time", by L. Wilhelmsson et. al., the actual Doppler frequency is needed in order to calculate the Wiener filter. Also, even if the channel estimation is not based on a Wiener filter approach, but on, for example, using filters of different complexity depending on how difficult the channel estimation is, an estimate of the Doppler frequency is needed.

DAB and DVB are just two of a number of systems in which the rate of channel variation can be considerable. In particular, for the newly developed DVB standard for Handheld devices (DVB-H), it can be expected that services are used when the user is completely standing still, implying a close to stationary channel, as well as when the user is traveling in a moving vehicle (e.g., a car), implying that a significant Doppler is experienced. DVB-H is based on OFDM, and one of the most computationally intensive blocks of the DVB-H receiver is that where channel estimation is performed. As described in the above-referenced U.S. patent application Ser. No. 10/920,928, knowledge of the Doppler spread can be used to find a suitable interpolation filter to be used for channel estimation.

The accuracy of the Doppler estimation will usually improve the longer Doppler measurements are made. However, allowing a longer time for measurement means not only that the actual estimation will take longer, but also that the receiver will be less responsive to fast variations in the actual Doppler spread. Thus, the time for performing Doppler estimation should be as short as possible, but still long enough to guarantee that the required accuracy is obtained.

Consequently, there is a need for being able to perform Doppler spread estimation in an efficient way.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that estimate a Doppler spread value of a channel in an Orthogonal Frequency Division Multiplexing (OFDM) system, wherein the channel comprises a plurality of carrier frequencies. Estimating involves selecting a set of two or more carrier frequencies from the plurality of carrier frequencies. A Doppler spread value is estimated for each of the selected carrier frequencies. An estimate of the Doppler spread value of the channel is produced by combining the estimated Doppler spread values of each of the selected carrier frequencies. For example, the Doppler spread value of the channel may be estimated by averaging the estimated Doppler spread values of each of the selected carrier frequencies.

In some embodiments, selecting the set of two or more carrier frequencies from the plurality of carrier frequencies comprises selecting a set of two or more carrier frequencies only from a set of continual pilot frequencies associated with the channel.

The number of carrier frequencies selected may be fixed. Alternatively, it may be a variable number, N, wherein N is a function of a value representing a delay spread of the channel.

In another aspect, estimating the Doppler spread value for each of the selected carrier frequencies comprises measuring the selected carrier frequencies for a duration of time, $T_{meas}$, wherein the duration of time, $T_{meas}$, is a function of a value representing a delay spread of the channel. In some but not necessarily all of these embodiments, the number of carrier frequencies selected may be a variable number, N, wherein N is a function of the value representing the delay spread of the channel.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

A number of embodiments are described herein that illustrate various aspects of the invention. In one aspect, the Doppler frequency experienced by an OFDM receiver is estimated. By exploiting the fact that the correlation between two frequencies will be relatively small for severely frequency selective channels compared to a flat channel, a more accurate Doppler estimation is disclosed that estimates the Doppler frequency at several carriers. In another aspect, since it is desirable that the time used for estimation not be unnecessarily large, a dynamic Doppler estimation technique includes adapting the time allocated for Doppler estimation based on the estimated delay spread of the channel.

Thus, in some embodiments described below, an estimation of the Doppler spread is made in parallel at several carriers in an OFDM system. Under certain conditions this allows the Doppler estimation to be done almost instantaneously. In some embodiments, knowledge of the delay spread is used to determine how long a time must be used for Doppler estimation. And, in some embodiments, a suitable number of carriers to be used for Doppler estimation is determined based on knowledge of the delay spread of the channel, thereby allowing close to optimum performance to be achieved at a minimum of computational complexity. These and other aspects of the invention will now be described in greater detail.

To help the reader to more readily understand the various aspects of invention, the following description is based on examples whose data are taken from the standard for terrestrial digital video broadcasting (DVB-T) (see ETSI EN 300 744 V.1.4.1 (2001-01), "Digital Video Broadcasting (DVB); Framing structure, channel coding and modulation for digital terrestrial television"—henceforth referred to as "ETSI document"). To be specific, it is assumed that the duration of the information carrying part of an OFDM symbol equals $T_u$=896 µs, and that the length of the guard interval (GI) is $T_u/4$=224 µs. As should be apparent to those of ordinary skill in the art, these and other specific numbers used in the description are only taken to more easily explain the various aspects of the invention, and are by no means essential to practicing the invention.

Figure 3:
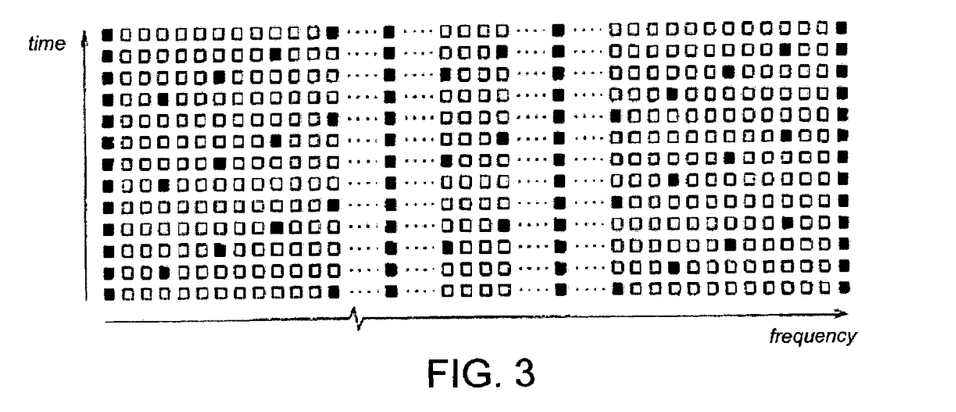
FIG. 3 is a timing diagram showing a signal frame structure in accordance with the DVB-T standard.

Now, in a first aspect of the invention, the Doppler spread of the channel is estimated by making use of the continual pilots that are transmitted on an OFDM channel. For example, in the 8 k mode, as described in the ETSI document, these are embedded in the data transmitted on 177 of the carriers that make up the OFDM channel. A timing diagram showing the frame structure in accordance with the DVB-T standard is illustrated in FIG. 3. The frequency domain extends along the horizontal axis, and the time domain extends along the vertical axis. Each square represents transmitted data; the vertical position of the square indicates its time of transmission, and the horizontal position of the square indicates which carrier frequency it is transmitted on. Black squares indicate pilot data. It can be seen from the diagram how the pilot data is scattered in a known pattern across both time and frequency. In particular, it can be seen that some carriers never convey pilot data, some carriers convey pilot data only periodically, and other carriers (i.e., those with solid columns of black squares) convey pilot data during every transmission time. These latter ones are the continual pilots.

The Doppler spread of an OFDM channel can be estimated using any one arbitrary continual pilot by employing any method that can be used in single carrier systems. An overview of such algorithms can, be found in, for example, C. Tepedelenlioğlu et al., "Estimation of Doppler spread and signal strength in mobile communications with applications to handoff and adaptive transmission," *Wirel. Commun. and Mob. Comput.*, pp. 221-242, Vol. 1, 2001. Briefly, the algorithms can be divided into three categories as follows:

1. Direct methods, where the channel response is used directly to estimate the Doppler spread.
2. Methods employing a model for the correlation as a function of Doppler frequency. By estimating the correlation function, an estimate of the Doppler spread is also obtained.
3. Methods based on the Doppler spectrum.

The techniques disclosed herein are applicable to any of the above categories. In the following discussion, however, attention is restricted to direct methods because they are of low complexity. Those of ordinary skill in the art will readily be able to adapt the principles made apparent in the following discussion to any of the other types of Doppler spread estimation techniques.

Direct methods are usually based on considering either the level crossing rate or the zero crossing rate. With respect to the level crossing rate, the absolute value of the channel response is used, and the number of times a certain level (relative to, e.g., the average power) is crossed is counted. With respect to the zero crossing rate, either the real or the imaginary part of the channel response is used, and the number of times either the real or the imaginary part crosses zero is considered. In this respect, zero crossing methods are advantageous over level crossing methods because they do not require estimation of the strength of the received signal. For this reason, the description below focuses on such methods, although the underlying ideas of the techniques disclosed herein also work when level crossing methods are used.

In case the crossings of either the real axis or the imaginary axis are considered, the expected number of zero crossings, $E[N_{zc}]$, is given by Eq. (3):

$$E[N_{zc}] = \sqrt{2} f_D T_{meas}, \quad (3)$$

where $T_{meas}$ is the time during which the number of zero crossings are counted. If crossings of both the real and the imaginary axis are counted, the expected number of crossings will be doubled. Whether one or two axes are used to estimate the Doppler, it is known that in case of low Doppler spread and relatively small signal-to-noise-ratio (SNR), the estimate tends to be too large. The reason for this is that if the true channel response is close to one axis, the noise can produce several crossings. Although this is a problem in general, it will be more pronounced when the Doppler spread is low (since this means that the true channel response might be close to an axis for a relatively long time) and when the SNR is small (since this means that the probability that the noise will cause some additional crossings will increase). In order to counteract this malfunction, it is possible to introduce some kind of hysteresis. For example, a hysteresis may be introduced in the way that consecutive crossings of the same axis are not counted. In addition to being very simple to implement, it has also been found empirically that the expected number of zeros crossings in case this hysteresis is used, $E[N_{zc,hyst}]$, is given by $$E[N_{zc,hyst}] = 2 f_D T_{meas}. \quad (4)$$

In case either of Eqs. (3) or (4) is used to estimate the Doppler spread, it is readily seen that in case a certain number of crossings is needed for the estimation to be considered reliable enough, the measurement time must be increased in case the Doppler is small. Alternatively, if the measurement time is kept constant, the accuracy of the Doppler estimate will improve for larger Doppler spreads.

Tables 1 and 2 present exemplary Doppler frequency estimates for an OFDM system in which each of the estimates is derived from measurements made on only one of the continual pilots carriers. In Table 1, the performance for three different algorithms for estimating the Doppler spread is compared when the SNR equals 10 dB:

TABLE 1

Comparison of mean and standard deviation for Doppler spread estimation at different actual Doppler spread conditions when the measurement time is 100 ms and SNR = 10 dB.

| | Actual $f_D$ = | | | | |
|---|---|---|---|---|---|
| Method | 5 Hz | 10 Hz | 20 Hz | 50 Hz | 100 Hz |
| Real only | 69 (63) | 60 (50) | 74 (38) | 86 (25) | 119 (21) |
| Real & imag | 79 (50) | 67 (45) | 71 (23) | 83 (18) | 119 (26) |
| Hysteresis | 23 (26) | 27 (23) | 32 (10) | 60 (13) | 103 (21) |

In the first algorithm, only the crossings of the imaginary axis are used (i.e., only the real part of the signal is used). In the second algorithm, crossings of both the real and the imaginary axes are used. Finally, in the third algorithm, crossings of both the real and the imaginary axis are used, but in addition the above-described hysteresis is implemented. As can be clearly seen, in all cases the noise causes the Doppler spread to be overestimated in all cases, but as expected, the most severe overestimation occurs for cases of small Doppler spread. It can also be seen that the introduction of a hysteresis significantly improves both the expected Doppler spread estimate and its standard deviation.

In Table 2, the corresponding results are shown for the case in which SNR=30 dB.

TABLE 2

Comparison of mean and standard deviation for Doppler estimation at different actual Doppler spread conditions when the measurement time is 100 ms and SNR = 30 dB.

| | Actual $f_D$ = | | | | |
|---|---|---|---|---|---|
| Method | 5 Hz | 10 Hz | 20 Hz | 50 Hz | 100 Hz |
| Real only | 12 (15) | 13 (11) | 24 (10) | 53 (12) | 100 (19) |
| Real & imag | 8.9 (8.6) | 13 (9) | 23 (9) | 53 (10) | 100 (13) |
| Hysteresis | 7.2 (3.6) | 13 (5) | 22 (8) | 53 (15) | 100 (19) |

As expected, the estimation improves, especially concerning the expected estimate. The above-mentioned improvement of the estimate for those cases of higher Doppler spread can also be seen. Taking as an example the algorithm in which hysteresis is used, the standard deviation relative to the expected value is decreased from 0.5 to less than 0.2 when going from 5 Hz to 100 Hz. If the crossings could be treated as being independent, one would expect that the standard deviation would decrease as $1/\sqrt{f_D}$, suggesting that a somewhat larger improvement would be expected.

It is clear from Tables 1 and 2 that the expected value of the Doppler spread is too high for the case in which the actual Doppler spread is low. This is especially the case when the SNR is low. It is therefore possible to counteract this malfunction of the estimator by adjusting the estimated Doppler spread somewhat by simply using a somewhat lower Doppler estimate than that obtained by the estimator.

It can also be seen from Tables 1 and 2 that the suggested estimator using hysteresis performs better than the other two. This is true if the mean of the estimator is considered, but perhaps even more importantly if the standard deviation is considered. A bias in the mean can be counteracted somewhat as described above, but a large variance cannot. Instead, the variance must typically be reduced by simply using a longer measurement time.

In an OFDM system, where the channel comprises a number of carriers, it is possible to obtain a more reliable estimate of the Doppler spread of the channel by estimating the Doppler spread on several different ones of the carrier frequencies, and then combining the results. For example, combining can be performed by calculating the average of the estimated Doppler spread values determined for the individual carriers. Below we will therefore consider the performance for the algorithm using hysteresis when all continual pilots are used and compare it to the case when the Doppler is estimated using only one carrier.

To illustrate this aspect of the invention, the 8 k mode of DVB-T as described in the ETSI document will once again be considered. As mentioned earlier, there are 177 continual pilots available in the 8 k mode. It is clear that estimating the Doppler in parallel on several frequencies will always have a positive effect in that the noise will be averaged. Therefore, it can also be expected that if the delay spread of the channel is small, a significant improvement of the Doppler estimation will be obtained. However, this improvement will be even larger if the channel variations on the different frequencies are substantially uncorrelated (i.e., close to or at least somewhat uncorrelated). To obtain a feeling for how large the delay spread has to be to make the frequencies where the continual pilots are located uncorrelated, examples of what the amplitude function of the channel might look like in case the excess delay equals $T_m = 1, 5, 10,$ and $20$ μs are considered, as shown in FIGS. 4-7, respectively. In each of the same figures, the locations of the continual pilots are also indicated as stars.

Figure 4:
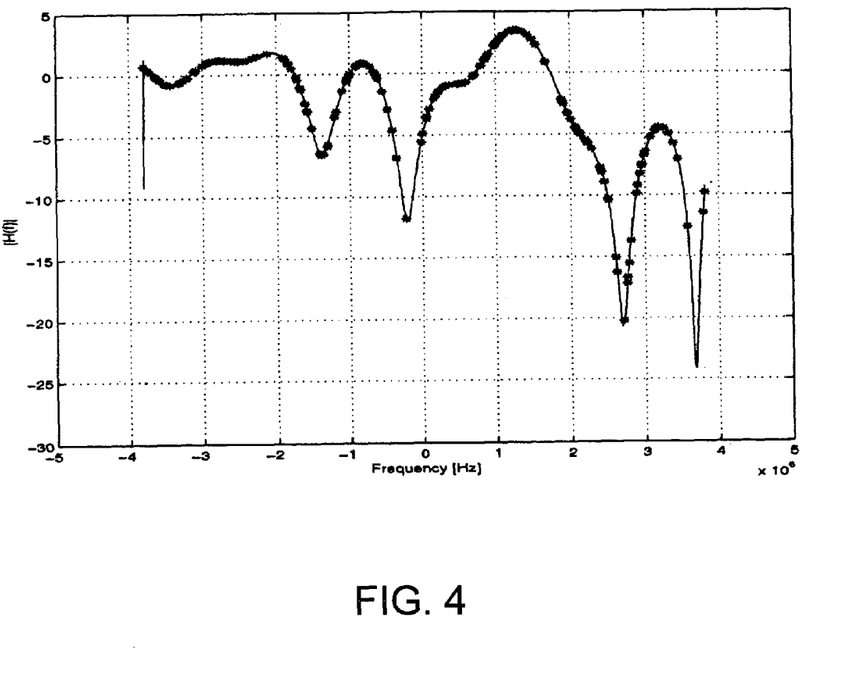
FIG. 4 is a graph of an exemplary amplitude function of an OFDM channel when $T_m$=1 µs.
Figure 5:
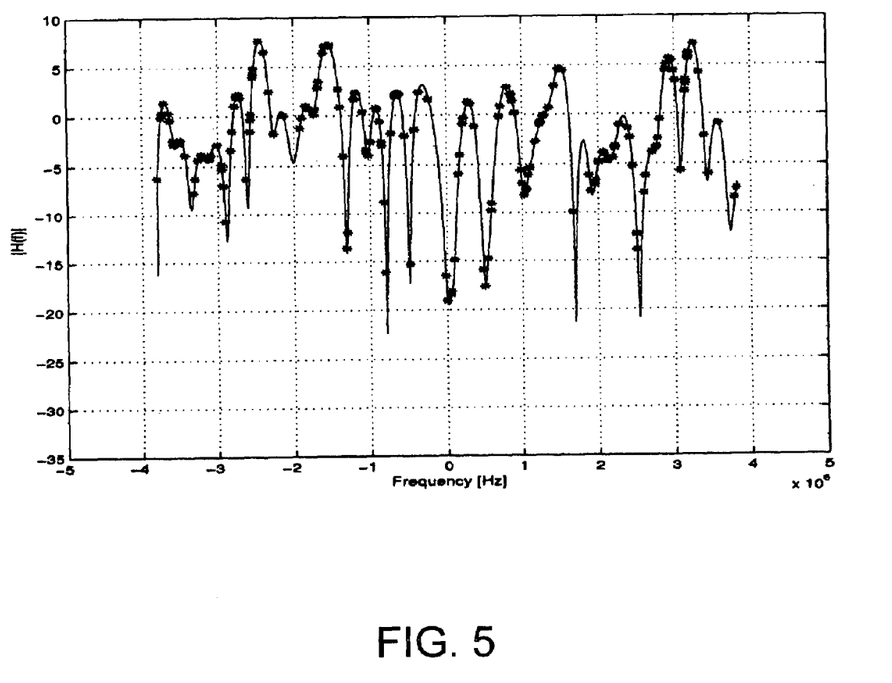
FIG. 5 is a graph of an exemplary amplitude function of an OFDM channel when $T_m$=5 µs.
Figure 6:
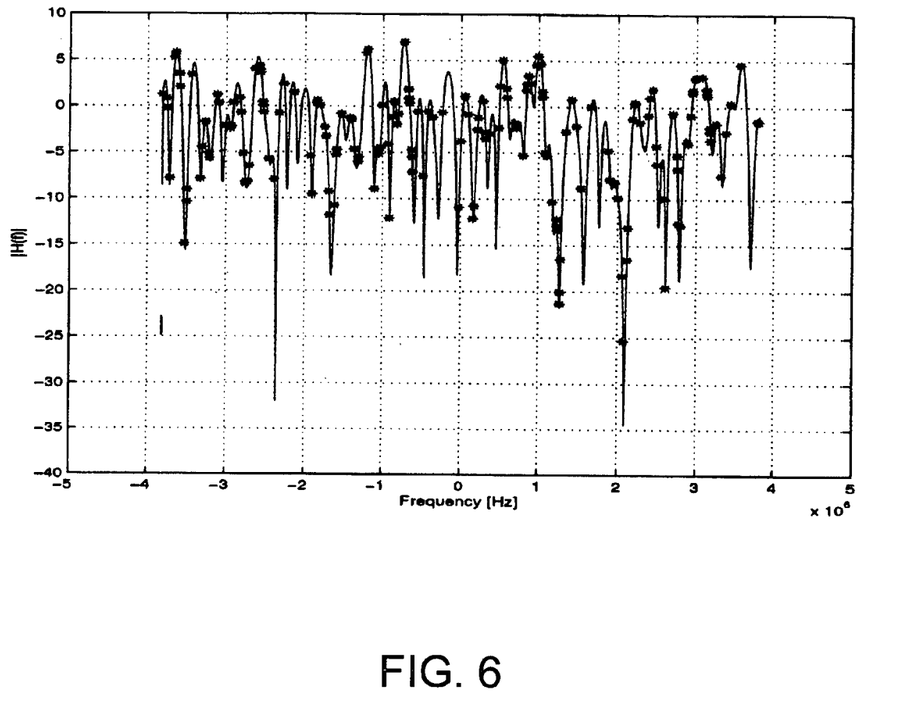
FIG. 6 is a graph of an exemplary amplitude function of an OFDM channel when $T_m$=10 µs.
Figure 7:
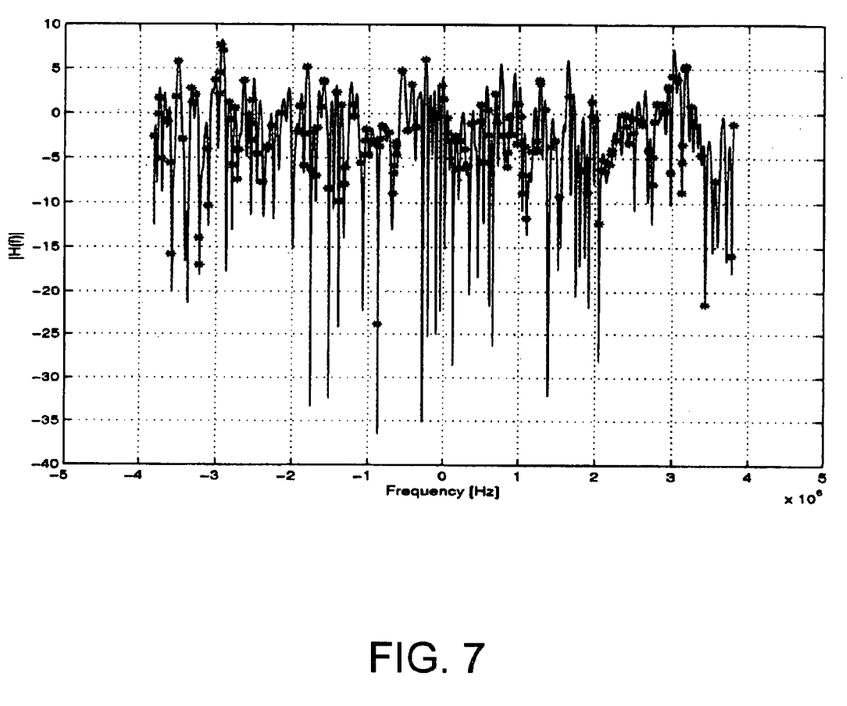
FIG. 7 is a graph of an exemplary amplitude function of an OFDM channel when $T_m$=20 µs.

FIG. 4 is a graph of an exemplary amplitude function of an OFDM channel when $T_m = 1$ μs. Referring to FIG. 4, which illustrates a channel amplitude function when $T_m = 1$ μs, it is readily seen that there is a very strong correlation between adjacent pilots, whereas even when $T_m$ is increased only to 5 μs (FIG. 5), the correlation between adjacent pilots has decreased significantly. In fact, comparing FIG. 5 with FIG. 6 ($T_m = 10$ and $20$ μs, respectively), one can expect that there will be only a relatively small additional decrease in correlation between adjacent pilots when $T_m$ is increased to more than 5 μs.

In Tables 3 and 4, the performance of Doppler spread estimation of an OFDM channel when estimates are made for all 177 continual pilots and then combined are given for the case of SNR=10 dB and 30 dB, respectively.

TABLE 3

Comparison of mean and standard deviation for Doppler spread estimation at different actual Doppler spread conditions and different maximum delay spreads when the measurement time is 100 ms and SNR = 10 dB.

| | Actual $f_D$ = | | | | |
|---|---|---|---|---|---|
| Delay spread | 5 Hz | 10 Hz | 20 Hz | 50 Hz | 100 Hz |
| $T_m = 1$ μs | 17 (3.0) | 22 (3.1) | 31 (3.2) | 60 (9.8) | 106 (17) |
| $T_m = 5$ μs | 18 (2.2) | 22 (1.4) | 32 (2.2) | 59 (5.8) | 105 (10) |

TABLE 3-continued

Comparison of mean and standard deviation for Doppler spread estimation at different actual Doppler spread conditions and different maximum delay spreads when the measurement time is 100 ms and SNR = 10 dB.

| | Actual $f_D$ = | | | | |
|---|---|---|---|---|---|
| Delay spread | 5 Hz | 10 Hz | 20 Hz | 50 Hz | 100 Hz |
| $T_m = 10$ μs | 18 (1.8) | 23 (1.9) | 32 (2.3) | 62 (4.5) | 105 (9.0) |
| $T_m = 20$ μs | 18 (1.8) | 22 (1.3) | 32 (1.9) | 60 (3.6) | 104 (8.9) |

TABLE 4

Comparison of mean and standard deviation for Doppler spread estimation at different actual Doppler spread conditions and different maximum delay spreads when the measurement time is 100 ms and SNR = 30 dB.

| | Actual $f_D$ = | | | | |
|---|---|---|---|---|---|
| Delay spread | 5 Hz | 10 Hz | 20 Hz | 50 Hz | 100 Hz |
| $T_m = 1$ μs | 7.1 (1.0) | 12 (1.9) | 23 (4.2) | 51 (11.2) | 96 (19) |
| $T_m = 5$ μs | 6.8 (0.7) | 12 (1.4) | 22 (2.1) | 52 (5.5) | 98 (11) |
| $T_m = 10$ μs | 6.8 (0.6) | 12 (1.9) | 22 (2.0) | 52 (5.5) | 97 (8.6) |
| $T_m = 20$ μs | 7.0 (0.5) | 12 (1.3) | 22 (1.7) | 51 (5.1) | 96 (8.3) |

Comparing with the results presented in Tables 1 and 2 (where Doppler spread of the OFDM channel was estimated by considering only a single carrier frequency), the improvement in performance is clearly seen. Specifically, the following things are noted:

A significant improvement is obtained for Doppler spread estimation of an OFDM channel using a combination of measurements from a number of carrier frequencies compared to estimating the Doppler spread using only one frequency. Considering the case of $f_D=5$ Hz and 10 dB SNR, the reduction in the standard deviation is 26/1.8=14, which agrees reasonably well with the theory.

The performance does not improve when the delay spread of the channel, $T_m$, is increased beyond 5 μs for the specific example considered.

Assuming that the delay spread is large enough for the zero crossings at the different frequencies used for Doppler estimation to be considered uncorrelated, the estimation time can be reduced by a factor related to the number of frequencies used for estimation. This is because the accuracy of the Doppler estimation is essentially determined by the number of zero crossings used for performing the estimation. To get a high degree of accuracy, a large number of zero crossings is needed. If the Doppler estimation is done using one frequency only, this means that the estimation time must be increased so that a sufficient number of zero crossings is obtained. If instead, say, N frequencies are used for Doppler estimation, then N times more zero crossings can be expected compared to the case in which only one frequency is used. Consequently, the same number of zero crossings can be expected for an estimator using N frequencies if the estimation time is reduced by the same factor N.

In most cases, the improvement in accuracy by using all continual pilots corresponds to a decreased measurement time by more than a factor of 100 for the specific example considered.

Figure 8:
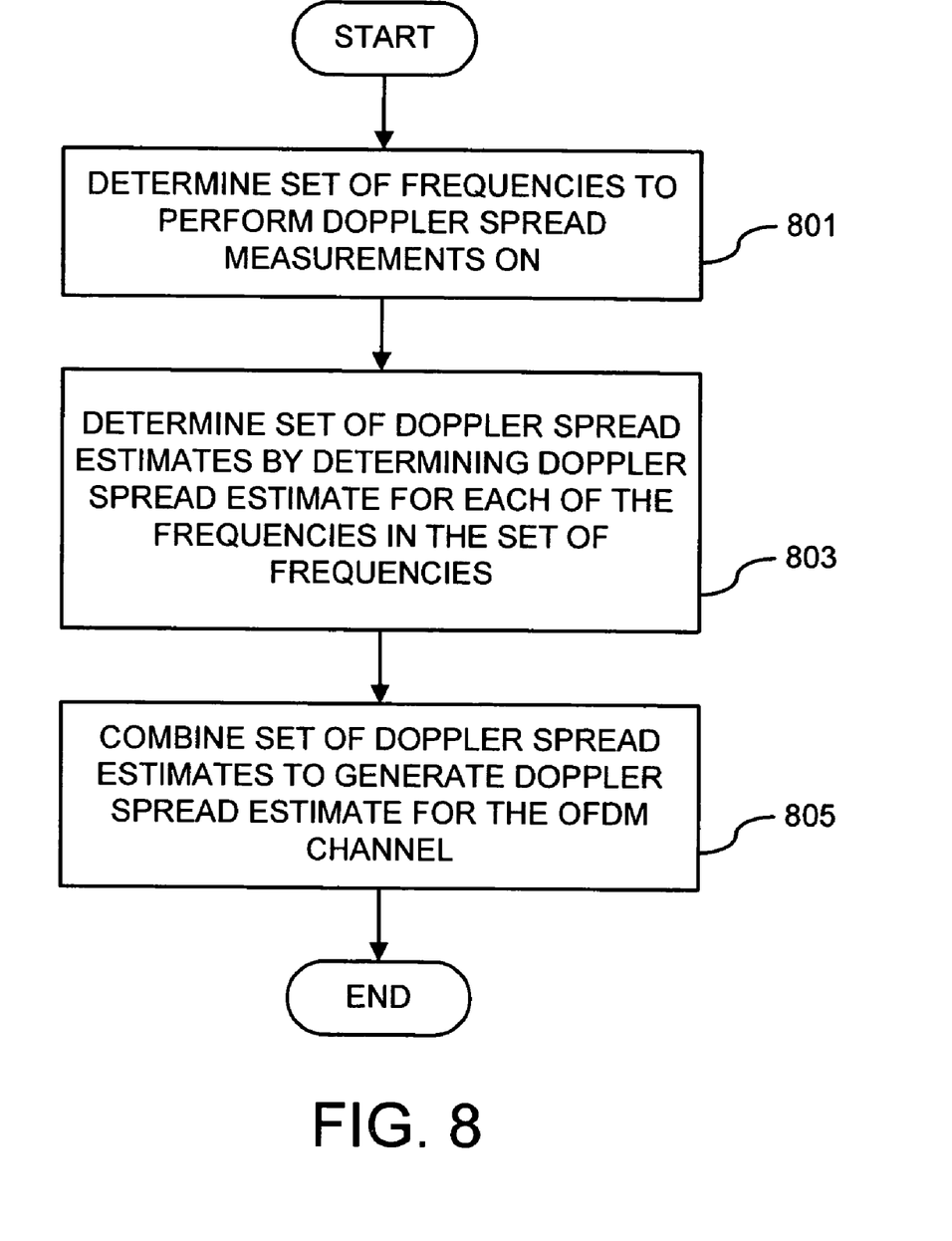
FIG. 8 is a flow diagram of a generalized procedure for determining the Doppler spread of an OFDM channel.

FIG. 8 is a flow diagram of a generalized procedure for determining the Doppler spread of an OFDM channel. The procedure may be carried out, for example, in a Doppler spread estimation unit in an OFDM receiver. For example, if the exemplary OFDM receiver of FIG. 2 were to be modified so as to further include logic for carrying out the invention, the logic for determining the Doppler spread of an OFDM channel in accordance with the invention could be included as part of the channel estimator 213.

To generate the Doppler spread estimate of an OFDM channel, a set of frequencies is determined, on which Doppler spread measurements will be made (step 801). For example, in OFDM systems that transmit pilot signals, such as DVB-T and DVB-H, some or all of the continual pilot frequencies might be selected. In some embodiments, the number of carriers to be measured is fixed. In alternative embodiments, the number of carriers to be measured is dynamically changeable, and can be based, for example, on the amount of delay spread of the channel. Techniques for estimating the delay spread of an OFDM channel are well-known, and need not be described here in detail. For example, the delay spread may be determined in accordance with U.S. patent application Ser. No. 11/110,840, entitled "Initial Parameter Estimation in OFDM Systems" by Anders Berkeman et al. and filed on even date herewith, which is hereby incorporated herein by reference.

Having determined a set of frequencies to be measured, a Doppler spread estimate is then made for each of those frequencies, thereby yielding a set of Doppler spread estimates (step 803). These estimates can be generated with any known technique for generating a Doppler spread estimate for a single frequency, including any of the techniques described earlier. For example, any of the zero- or level-crossing techniques mentioned earlier can be used, with or without including hysteresis as described.

As explained earlier, a number of factors can affect the accuracy of the measurements, including the length of the measurement time, $T_{meas}$, and the extent to which the frequencies upon which measurements are made are correlated with one another. Also as explained earlier, the extent of correlation is related to the delay spread of the channel. These relationships can be used in alternative embodiments by adjusting the measurement time, $T_{meas}$, as a function of the amount of delay spread determined for the OFDM channel under consideration. More particularly, the embodiments can be derived that dynamically adjust the measurement time as a function of the amount of delay spread of the channel. Since the higher the level of delay spread the less correlated the set of measurement frequencies are with one another, a desired level of accuracy can be achieved with shorter measurement times when the delay spread is larger.

Accordingly, in some embodiments the measurement time can be adjusted downward the higher the delay spread of the channel is. In yet other alternatives, the measurement time, $T_{meas}$, may be selected from a limited set of measurement times (e.g., two possibilities) based on whether the delay spread is at or above a predetermined level, which will be determined empirically based on the given system characteristics. For example, in the exemplary system described earlier, it was shown that the set of continual pilot frequencies are substantially uncorrelated with one another when the delay spread is at or above Tm=5 μs. Thus, one could design a system in which a relatively longer measurement time interval, $T_{meas}$ is used when the delay spread of the channel satisfies Tm<5 μs, and a relatively shorter measurement time interval, $T_{meas}$ is used when the delay spread of the channel satisfies Tm≧5 μs. Of course, these values and threshold conditions are merely intended to be exemplary; actual threshold values and test conditions will of necessity be tailored to suit the particular system and channel conditions expected to be encountered in any particular embodiment.

The individual Doppler spread estimates determined in step 803 are then combined to generate the Doppler spread estimate of the OFDM channel (step 805). Combination can be performed by, for example, averaging the Doppler spread estimates determined for the individual channels, and then using the average as the Doppler spread estimate of the OFDM channel. Simple averaging techniques can be used, or in alternative embodiments, weighted averages can be performed in which the weighting given any one Doppler spread estimate is a function of the signal quality on that particular carrier frequency.

The invention has been described with reference to particular embodiments. However, it will be readily apparent to those skilled in the art that it is possible to embody the invention in specific forms other than those of the embodiment described above.

For example, it has been described how selecting the set of two or more carrier frequencies from the plurality of carrier frequencies can comprise selecting a variable number, N, of carrier frequencies from the plurality of carrier frequencies, wherein N is a function of a value representing a delay spread of the channel. It has also been described how estimating the Doppler spread value for each of the selected carrier frequencies can comprise measuring the selected carrier frequencies for a duration of time, $T_{meas}$, wherein the duration of time, $T_{meas}$, is a function of a value representing a delay spread of the channel. These aspects need not be practiced together in any particular embodiment. However, they may be practiced together. For example, based on the delay spread of the channel, a suitable value of N can be determined. Then, based on N, a suitable value of $T_{meas}$ can be determined such that sufficient accuracy will be obtained. Since $T_{meas}$ in this instance is a function of N, it is therefore also a function of the delay spread value.

Thus, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of estimating a Doppler spread value of a channel in an Orthogonal Frequency Division Multiplexing (OFDM) system, wherein the channel comprises a plurality of carrier frequencies, the method comprising:

a receiver ascertaining a value representing a delay spread of the channel;

selecting a set of two or more carrier frequencies from the plurality of carrier frequencies;

estimating a Doppler spread value for each of the selected carrier frequencies; and producing an estimate of the Doppler spread value of the channel by combining the estimated Doppler spread values of each of the selected carrier frequencies, wherein the value representing the delay spread of the channel is used in the method to influence the estimate of the Doppler spread value of the channel at least by performing one or both of influencing selection of the set of two or more carrier frequencies from the plurality of carrier frequencies and influencing the estimation of the Doppler spread value for each of the selected carrier frequencies, wherein influencing selection of the set of two or more carrier frequencies from the plurality of carrier frequencies comprises:
  selecting a variable number, N, of carrier frequencies from the plurality of carrier frequencies,
  wherein N is a function of the value representing the delay spread of the channel,
and wherein influencing estimation of the Doppler spread value for each of the selected carrier frequencies comprises:
  measuring the selected carrier frequencies for a duration of time, $T_{meas}$,
  wherein the duration of time, $T_{meas}$, is a function of the value representing the delay spread of the channel.

2. The method of claim 1, wherein selecting the set of two or more carrier frequencies from the plurality of carrier frequencies comprises:
  selecting the set of two or more carrier frequencies only from a set of continual pilot frequencies associated with the channel.

3. The method of claim 2, wherein selecting the set of two or more carrier frequencies only from the set of continual pilot frequencies associated with the channel comprises:
  selecting all of the continual pilot frequencies associated with the channel.

4. The method of claim 1, wherein selecting the set of two or more carrier frequencies from the plurality of carrier frequencies comprises:
  selecting a fixed number of carrier frequencies from the plurality of carrier frequencies.

5. The method of claim 1, wherein estimating the Doppler spread value for each of the selected carrier frequencies comprises:
  measuring zero crossings of signals received on the selected carrier frequencies for a duration of time, $T_{meas}$.

6. The method of claim 5, wherein measuring the zero crossings of signals received on the selected carrier frequencies for the duration of time, $T_{meas}$, is constrained by a hysteresis criterion.

7. The method of claim 1, wherein combining the estimated Doppler spread values of each of the selected carrier frequencies comprises averaging the estimated Doppler spread values of each of the selected carrier frequencies.

8. The method of claim 1, wherein combining the estimated Doppler spread values of each of the selected carrier frequencies comprises determining a weighted average of the estimated Doppler spread values of each of the selected carrier frequencies.

9. The method of claim 8, wherein in determining the weighted average, each of the estimated Doppler spread values is weighted as a function of a signal quality measurement of the selected carrier frequency associated with the estimated Doppler spread value.

10. An apparatus for estimating a Doppler spread value of a channel in an Orthogonal Frequency Division Multiplexing (OFDM) system, wherein the channel comprises a plurality of carrier frequencies, the apparatus comprising:
  means for ascertaining a value representing a delay spread of the channel;
  means for selecting a set of two or more carrier frequencies from the plurality of carrier frequencies;
  means for estimating a Doppler spread value for each of the selected carrier frequencies; and
  means for producing an estimate of the Doppler spread value of the channel by combining the estimated Doppler spread values of each of the selected carrier frequencies,
  wherein the apparatus includes means for using the value representing the delay spread of the channel to influence the estimate of the Doppler spread value of the channel, wherein:
    at least a portion of the means for using the value representing the delay spread of the channel to influence the estimate of the Doppler spread value operates as part of the means for selecting the two or more carrier frequencies from the plurality of carrier frequencies; and
    the means for selecting the set of two or more carrier frequencies from the plurality of carrier frequencies comprises:
      means for selecting a variable number, N, of carrier frequencies from the plurality of carrier frequencies,
      wherein N is a function of the value representing the delay spread of the channel.

11. The apparatus of claim 10, wherein the means for selecting the set of two or more carrier frequencies from the plurality of carrier frequencies comprises:
  means for selecting a set of two or more carrier frequencies only from a set of continual pilot frequencies associated with the channel.

12. The apparatus of claim 11, wherein the means for selecting the set of two or more carrier frequencies only from the set of continual pilot frequencies associated with the channel comprises:
  means for selecting all of the continual pilot frequencies associated with the channel.

13. The apparatus of claim 10, wherein the means for selecting the set of two or more carrier frequencies from the plurality of carrier frequencies comprises:
  means for selecting a fixed number of carrier frequencies from the plurality of carrier frequencies.

14. The apparatus of claim 10, wherein the means for estimating the Doppler spread value for each of the selected carrier frequencies comprises:
  means for measuring zero crossings of signals received on the selected carrier frequencies for a duration of time, $T_{meas}$.

15. The apparatus of claim 14, wherein the means for measuring zero crossings of signals received on the selected carrier frequencies for the duration of time, $T_{meas}$, is constrained by a hysteresis criterion.

16. The apparatus of claim 10, wherein the means for combining the estimated Doppler spread values of each of the selected carrier frequencies comprises means for averaging the estimated Doppler spread values of each of the selected carrier frequencies.

17. The apparatus of claim 10, wherein the means for combining the estimated Doppler spread values of each of the selected carrier frequencies comprises:
  means for determining a weighted average of the estimated Doppler spread values of each of the selected carrier frequencies.

18. The apparatus of claim 17, wherein the means for determining the weighted average weights each of the estimated Doppler spread values as a function of a signal quality measurement of the selected carrier frequency associated with the estimated Doppler spread value.

19. An apparatus for estimating a Doppler spread value of a channel in an Orthogonal Frequency Division Multiplexing (OFDM) system, wherein the channel comprises a plurality of carrier frequencies, the apparatus comprising:
  means for ascertaining a value representing a delay spread of the channel;
  means for selecting a set of two or more carrier frequencies from the plurality of carrier frequencies;

means for estimating a Doppler spread value for each of the selected carrier frequencies; and
means for producing an estimate of the Doppler spread value of the channel by combining the estimated Doppler spread values of each of the selected carrier frequencies,
wherein the apparatus includes means for using the value representing the delay spread of the channel to influence the estimate of the Doppler spread value of the channel, wherein:
at least a portion of the means for using the value representing the delay spread of the channel to influence the estimate of the Doppler spread value operates as part of the means for estimating the Doppler spread value for each of the selected carrier frequencies; and
the means for estimating the Doppler spread value for each of the selected carrier frequencies comprises:
means for measuring the selected carrier frequencies for a duration of time, $T_{meas}$,
wherein the duration of time, $T_{meas}$, is a function of the value representing the delay spread of the channel.

20. The apparatus of claim 19, wherein:
at least a portion of the means for using the value representing the delay spread of the channel to influence the estimate of the Doppler spread value operates as part of the means for selecting the two or more carrier frequencies from the plurality of carrier frequencies; and
the means for selecting the set of two or more carrier frequencies from the plurality of carrier frequencies comprises:
means for selecting a variable number, N, of carrier frequencies from the plurality of carrier frequencies,
wherein N is a function of the value representing the delay spread of the channel.

21. The apparatus of claim 19, wherein the means for selecting the set of two or more carrier frequencies from the plurality of carrier frequencies comprises:
means for selecting the set of two or more carrier frequencies only from a set of continual pilot frequencies associated with the channel.

22. The apparatus of claim 21, wherein the means for selecting the set of two or more carrier frequencies only from the set of continual pilot frequencies associated with the channel comprises:
means for selecting all of the continual pilot frequencies associated with the channel.

23. The apparatus of claim 19, wherein the means for selecting the set of two or more carrier frequencies from the plurality of carrier frequencies comprises:
means for selecting a fixed number of carrier frequencies from the plurality of carrier frequencies.

24. The apparatus of claim 19, wherein the means for estimating the Doppler spread value for each of the selected carrier frequencies comprises:
means for measuring zero crossings of signals received on the selected carrier frequencies for a duration of time, $T_{meas}$.

25. The apparatus of claim 24, wherein the means for measuring zero crossings of signals received on the selected carrier frequencies for the duration of time, $T_{meas}$, is constrained by a hysteresis criterion.

26. The apparatus of claim 19, wherein the means for combining the estimated Doppler spread values of each of the selected carrier frequencies comprises means for averaging the estimated Doppler spread values of each of the selected carrier frequencies.

27. The apparatus of claim 19, wherein the means for combining the estimated Doppler spread values of each of the selected carrier frequencies comprises:
means for determining a weighted average of the estimated Doppler spread values of each of the selected carrier frequencies.

28. The apparatus of claim 27, wherein the means for determining the weighted average weights each of the estimated Doppler spread values as a function of a signal quality measurement of the selected carrier frequency associated with the estimated Doppler spread value.

29. A machine readable storage medium having stored thereon a set of instructions for estimating a Doppler spread value of a channel in an Orthogonal Frequency Division Multiplexing (OFDM) system, wherein the channel comprises a plurality of carrier frequencies, the set of instructions causing a processor to perform a process comprising:
ascertaining a value representing a delay spread of the channel;
selecting a set of two or more carrier frequencies from the plurality of carrier frequencies;
estimating a Doppler spread value for each of the selected carrier frequencies; and
producing an estimate of the Doppler spread value of the channel by combining the estimated Doppler spread values of each of the selected carrier frequencies,
wherein the value representing the delay spread of the channel is used in the process to influence the estimate of the Doppler spread value of the channel at least by performing one or both of influencing selection of the set of two or more carrier frequencies from the plurality of carrier frequencies and influencing the estimation of the Doppler spread value for each of the selected carrier frequencies,
wherein influencing selection of the set of two or more carrier frequencies from the plurality of carrier frequencies comprises:
selecting a variable number, N, of carrier frequencies from the plurality of carrier frequencies,
wherein N is a function of the value representing the delay spread of the channel,
and wherein influencing estimation of the Doppler spread value for each of the selected carrier frequencies comprises:
measuring the selected carrier frequencies for a duration of time, $T_{meas}$,
wherein the duration of time, $T_{meas}$, is a function of the value representing the delay spread of the channel.

* * * * *